United States Patent
Kim

[11] Patent Number: 5,877,816
[45] Date of Patent: Mar. 2, 1999

[54] APPARATUS AND METHOD FOR DETECTING FIELD SYNC SIGNALS AND GENERATING USEABLE FIELD SYNC SIGNALS IN A HIGH DEFINITION TELEVISION RECEIVER

[75] Inventor: Ki-bum Kim, Seoul, Rep. of Korea

[73] Assignee: Samsung Electronics Co., Ltd., Kyungki-do, Rep. of Korea

[21] Appl. No.: 781,193

[22] Filed: Jan. 10, 1997

[30] Foreign Application Priority Data

Jan. 12, 1996 [KR] Rep. of Korea ............... 96-534

[51] Int. Cl.⁶ ................. H04N 5/04; H04N 5/10
[52] U.S. Cl. ............ 348/526; 348/426; 348/500; 348/845; 348/521
[58] Field of Search ............... 348/526, 525, 348/500, 521, 529, 426, 531, 530, 540, 527, 423, 845, 845.1–845.3, 434, 435, 429, 471, 472, 495, 558; 375/368, 366, 365; 370/506, 510, 512; H04N 5/04, 5/10

[56] References Cited

U.S. PATENT DOCUMENTS

| | | | |
|---|---|---|---|
| 5,245,431 | 9/1993 | Okada et al. | 358/154 |
| 5,247,359 | 9/1993 | Okada et al. | 358/152 |
| 5,473,387 | 12/1995 | Okada et al. | 348/526 |
| 5,502,501 | 3/1996 | Rumreich et al. | 348/526 |
| 5,534,938 | 7/1996 | Citta et al. | 348/495 |
| 5,541,960 | 7/1996 | Satomura et al. | 375/368 |
| 5,548,339 | 8/1996 | Kim | 348/525 |
| 5,594,506 | 1/1997 | Yang | 348/531 |
| 5,598,220 | 1/1997 | Citta et al. | 348/471 |
| 5,604,541 | 2/1997 | Kim et al. | 348/426 |
| 5,606,373 | 2/1997 | Dopp et al. | 348/526 |
| 5,619,269 | 4/1997 | Lee et al. | 348/495 |
| 5,619,275 | 4/1997 | Tults | 348/526 |
| 5,661,528 | 8/1997 | Han | 348/607 |
| 5,751,347 | 5/1998 | Seccia et al. | 348/181 |
| 5,754,250 | 5/1998 | Cooper | 348/525 |

FOREIGN PATENT DOCUMENTS

| | | | |
|---|---|---|---|
| 62-245870 | 10/1987 | Japan | H04N 5/10 |
| WO 93/01680 | 1/1993 | WIPO | H04N 5/04 |
| WO 93/01681 | 1/1993 | WIPO | H04N 5/10 |

*Primary Examiner*—John K. Peng
*Assistant Examiner*—Jean W. Désir
*Attorney, Agent, or Firm*—Sughrue, Mion, Zinn, Macpeak & Seas, PLLC

[57] ABSTRACT

An apparatus for detecting a field sync signal in a HDTV includes a sign bit selector for selecting only a sign bit from a received HDTV signal; a correlation portion for determining the correlation value of the selected sign bit and a predetermined reference signal; a detector for comparing the correlation value with a threshold value, to thereby determine a field sync timing signal; and a generator for generating a field sync signal which has a logic "HIGH" level during one field sync segment interval in response to the field sync timing signal. Here, only one MSB of input data is selected and then correlation with the reference signal is determined. Accordingly, a field sync signal which has a logic "HIGH" level during one field segment interval in each field can be accurately detected, and thus a hardware structure is simplified.

16 Claims, 5 Drawing Sheets

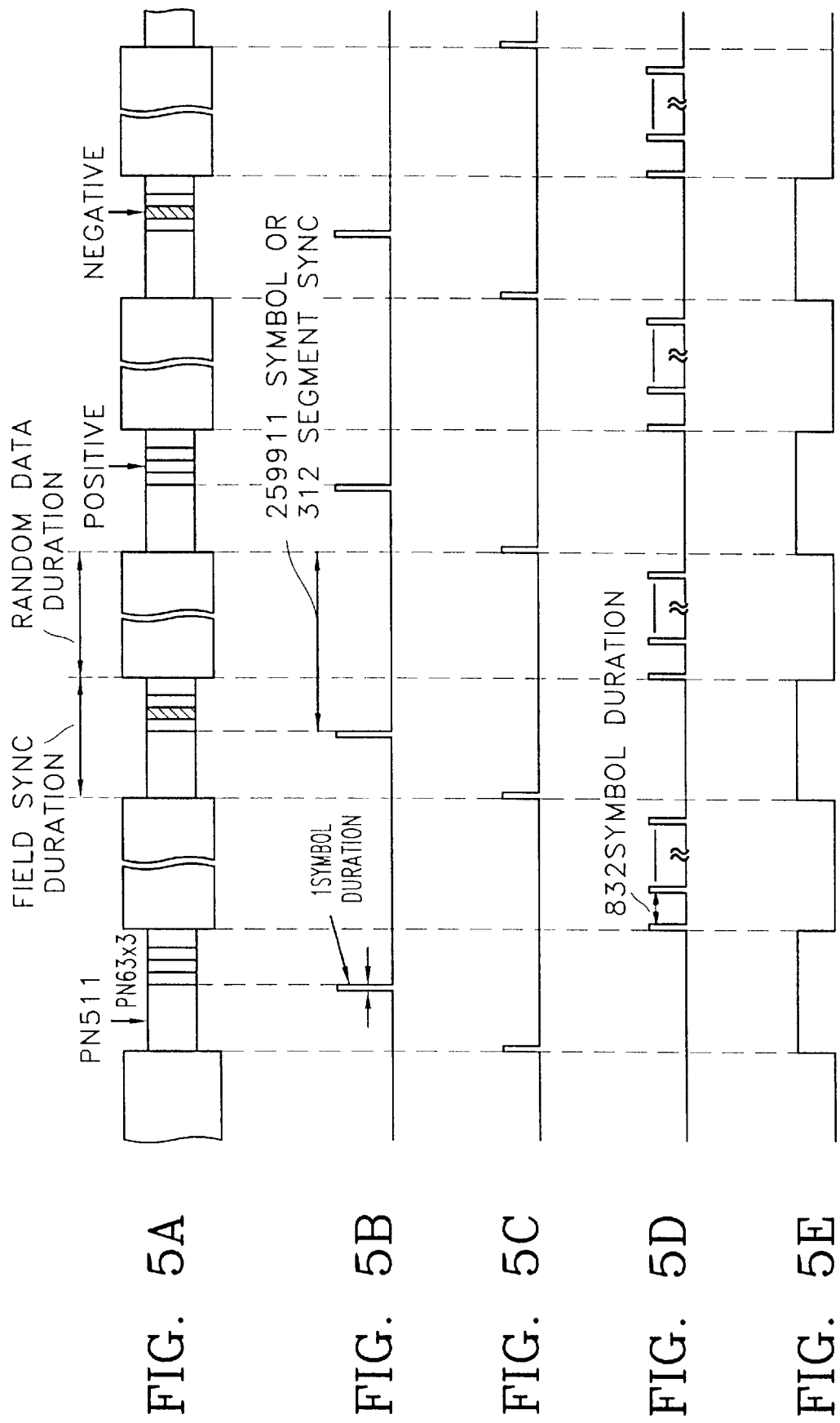

APPARATUS AND METHOD FOR DETECTING FIELD SYNC SIGNALS AND GENERATING USEABLE FIELD SYNC SIGNALS IN A HIGH DEFINITION TELEVISION RECEIVER

BACKGROUND OF THE INVENTION

The present invention relates to an apparatus and method to detect field sync signals in a high definition television. More particularly, the invention relates to an apparatus and method to detect field sync signals by correlating input data and a reference value.

As a result of significant effort expended in developing a television having a large screen and high resolution, a high definition television (HDTV) receiver for receiving HDTV signals has been produced in Japan.

In the United States, the Grand Alliance (GA) committee has proposed technical standards for designing a HDTV system. The GA committee has adopted the vestigial side band (VSB) modulation as a GA-HDTV modulation standard, including an 8-VSB standard having eight levels for terrestrial broadcast mode and a 16-VSB standard having sixteen levels for high speed cable mode.

FIG. 1 illustrates the format of a VSB data frame according to the GA-HDTV modulation standard. The VSB data frame has two fields, and each field has one field sync segment and 312 data segments. The field sync segments FIELD SYNC #1 and FIELD SYNC #2 are located in the first segment of each field to indicate the beginning of the field.

Each of the data segments has 4 symbols for segment synchronization and 828 data symbols. The segment synchronization is located at the beginning of each data segment and has a predetermined pattern in which the four sync symbols have signal levels of +5, −5, −5, +5. Each of the data symbols assumes an arbitrary signal level out of the eight possible levels ±1, ±3, ±5 and ±7.

FIG. 2 is a drawing for explaining a VSB field sync signal of a GA-HDTV.

As shown in FIG. 2, the field sync segment has 832 symbols. The initial 4 symbols are used for segment synchronization. The segment synchronization is followed by 511 symbols, designated as pseudo number PN511, which are in turn followed by 189 symbols divided into three PN63s. The remaining 128 symbols are used to carry other information.

Here, PN511 is a predetermined signal sequence composed of +5 and −5 levels and is used as a training sequence for use in equalization. The phase of the second PN63 is inverted in each field.

Since a field synchronization indicating the beginning of the field is located in the first segment of each field and has a uniform form, the field sync signals can be detected in the receiver. While the signals may be easily detected, the field sync signals should also be detected with accuracy in order to perform synchronization and decoding in a receiver.

SUMMARY OF THE INVENTION

Accordingly, it is an object of the present invention to provide an apparatus for detecting a field sync signal in a GA-HDTV by use of the correlation of a sync signal sequence in the first segment of each field and a reference signal and generating a useable sync signal.

It is another object of the present invention to provide a method for detecting a field sync signal in a GA-HDTV by use of the correlation of a sync signal sequence in the first segment of each field and a reference signal and generating a useable sync signal.

To accomplish the above object of the present invention, there is provided an apparatus for detecting a field sync signal in a HDTV receiver comprising: sign bit selection means for selecting only a sign bit in a received HDTV signal; correlation means for determining the correlation value of the selected sign bit and a predetermined reference signal; detection means for comparing the correlation value with a threshold value to determine a field sync timing signal; and generating means for generating a field sync signal which has a logic "HIGH" level during one field sync segment interval in response to the field sync timing signal.

To accomplish another object of the present invention, there is provided a method of detecting a field sync signal included in a received HDTV signal, comprising the steps of: a) selecting only a sign bit from the received HDTV signal; b) determining the correlation value of the sign bit and a predetermined reference signal; c) comparing the correlation value determined in the step b) with a threshold value, to thereby detect a field sync timing signal; and d) generating a field sync signal which has a logic "HIGH" level during one field sync segment interval in response to the field sync timing signal.

BRIEF DESCRIPTION OF THE DRAWINGS

The above objects and advantages of the present invention will become more apparent by describing in detail a preferred embodiment thereof with reference to the attached drawings in which:

FIG. 5A is a waveform diagram of input data;

FIG. 5B is a waveform diagram of a field sync timing signal;

FIG. 5C is a waveform diagram of the output of a first counter;

FIG. 5D is a waveform diagram of the output of a second counter; and

FIG. 5E is a waveform diagram of a field sync signal produced by the field sync detection circuit according to the present invention.

DETAILED DESCRIPTION OF THE INVENTION

Figure 3:
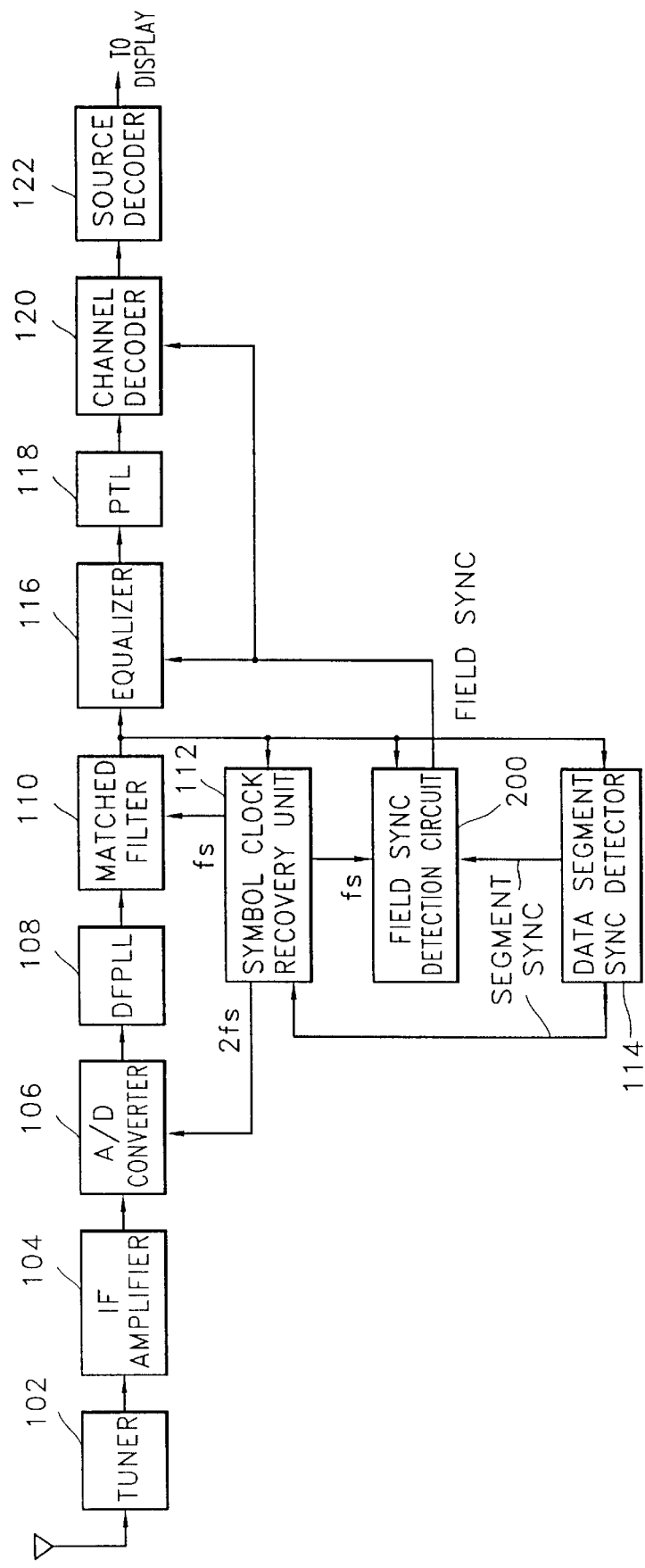
FIG. 3 is a block diagram of a HDTV receiver according to the present invention.

FIG. 3 is a block diagram of an HDTV receiver according to the present invention. Specifically, the HDTV receiver comprises a tuner 102, an intermediate frequency (IF) amplifier 104, an analog-to-digital (A/D) converter 106, a digital frequency and phase locked loop (DFPLL) 108, a matched filter 110, a symbol clock recovery unit 112, a data segment sync detector 114, a field sync detection circuit 200, an equalizer 116, a phase tracking loop (PTL) 118, a channel decoder 120, and a source decoder 122.

The tuner 102 receives broadcast signals via an antenna, selectively tunes a particular HDTV channel, and converts the HDTV signal of the tuned channel into an intermediate frequency (IF) signal.

The IF amplifier 104 amplifies the output signal of the tuner 102 such that the input of the A/D converter 106 is maintained at proper levels.

The analog-to-digital converter 106 converts the analog IF signal output from the IF amplifier 104 into digital signals in accordance with a sampling clock supplied from the symbol clock recovery unit 112.

The digital frequency and phase locked loop (DFPLL) circuit 108 recovers the carrier signal by detecting the pilot signal contained in the data output from the A/D converter 106. Then, the DFPLL 108 demodulates the data output from the A/D converter 106 into a baseband signal by multiplying the data by a recovered carrier signal.

The matched filter 110 matches the demodulated baseband signals, to thereby eliminate signal distortion and aliasing, and controls the symbol rate of data output from the DFPLL circuit 108. The symbol rate of data output from the matched filter 110 is fs, while the symbol rate of data input to the matched filter 110 is 2fs.

The symbol clock recovery unit 112 recovers a symbol clock in response to the output of the matched filter 110 and a data segment sync signal output from the data segment sync signal detector 114. Additionally, the symbol clock recovery unit 112 generates a sampling clock having a frequency (2fs) which is twice that of the symbol clock and provides the sampling clock to the A/D converter 106. The symbol clock recovered by the symbol clock recovery unit 112 is supplied to processing blocks (not shown) which processes digital signals. The clock signal is also supplied to the analog-to-digital converter 106, the matched filter 110, and the field sync detection circuit 200.

The data segment sync detector 114 calculates the correlation value of data output from the matched filter 110 in a unit of 4 symbols, and accumulates the calculated correlation values in a segment unit.

Then, it generates a data segment sync signal at the time when the accumulated correlation value has a maximum value in each data segment, using the characteristic that the correlation value of the 4 field sync symbols is maximal. In other words, the accumulated correlation values has a maximum value in the sync symbol intervals of the segment.

The field sync detection circuit 200 determines the correlation of data output from the matched filter 110 and a reference signal, to thereby generate field sync signals by use of a symbol clock (fs) from the symbol clock recovery unit 112 and a data segment sync signal from the data segment sync detector 114.

The field sync signals are input to an equalizer 116 and a channel decoder 120, to be used for equalization and decoding of data.

The equalizer 116 eliminates multipath distortion and outputs an undistorted signal. The multipath distortion results from the reflection of electromagnetic waves off of landscape features, buildings, airplanes, etc. when the HDTV signal is broadcast over the earth. Specifically, the equalizer 116 carries out the equalizing operation by updating the coefficients of a filter therein using the training sequence PN511 located in the field sync segment according to the field sync signals output from the field sync detection circuit 200. Meanwhile, data having an arbitrary level is output during the updating period of the coefficient. Thus, high speed tracking of moving ghost signals are ensured.

The phase tracking loop (PTL) 118 receives the undistorted signal and corrects any phase noise, i.e., phase error which was not completely eliminated by the DFPLL circuit 108.

The channel decoder 120 receives the phase corrected signal from the PTL 118 and decodes the phase corrected signal in a manner corresponding to the manner in which the original HDTV signal was encoded prior to transmission. For example, in order to reduce the symbol errors generated during transmission, the HDTV signal may be coded via a Reed-Solomon (RS) coding process, an interleaving operation, and a Trellis coded modulation (TCM) process before being transmitted. At the receiver, the channel decoder 120 would perform a Trellis demodulation operation on the phase corrected signal to produce an interleaved signal and would perform a de-interleaving operation on the interleaved signal to produce a de-interleaved signal. Finally, the decoder 120 would perform an RS decoding operation on the de-interleaved signal based on the parity of such signal in order to produce an error corrected signal.

The source decoder 122 receives the error corrected signal and performs a variable length decoding operation to produce a decoded signal and performs an inverse quantizing operation on the decoded signal to generate inverse quantized data. Subsequently, the decoder 122 performs an inverse discrete cosine transform (IDCT) operation in accordance with the quantization step size used during the encoding process of the original HDTV signal. As a result, the compressed data is converted into the original HDTV signal, and the original signal may be displayed.

Figure 4:
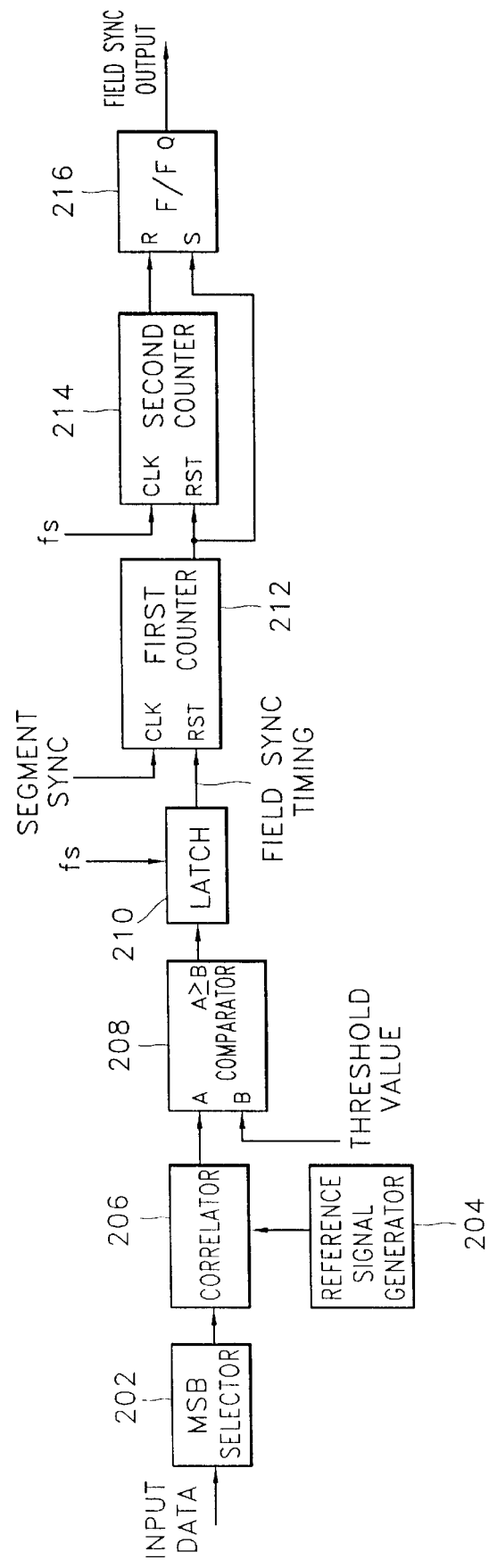
FIG. 4 is a detailed block diagram of the field sync detection circuit shown in FIG. 3.

FIG. 4 is a detailed block diagram of the field sync detection circuit shown in FIG. 3.

The field sync detection circuit 200 includes a most significant bit (MSB) selector 202, a reference signal generator 204, a correlator 206, a comparator 208, a latch 210, a first counter 212, a second counter 214, and a flip-flop 216.

The most significant bit (MSB) selector 202 selects only the MSB (also called a sign bit) of signals output from the matched filter 110 of FIG. 3.

The reference signal generator 204 generates a PN511 reference signal.

The correlator 206 calculates the correlation value of the MSB from the MSB selector 202 and the reference signal from the reference signal generator 204.

The comparator 208 receives the output of the correlator 206 and a threshold value through first and second input terminals A and B, respectively, and compares such signals.

The latch 210 receives the output of the comparator 208 according to the symbol clock fs and temporarily stores the input data.

The first counter 212 receives the segment sync signal from the segment sync detector 114 of FIG. 3 and the output of the latch 210 through a clock input terminal CLK and a reset terminal RST, respectively, counts up to 312 data segments, and outputs a carry when the counted value is reset to 0.

The second counter 214 receives a symbol clock signal from the symbol clock recovery unit 112 and the carry from the first counter 212 through a clock input terminal CLK and a reset terminal RST, respectively, counts up to 832 symbols, and outputs a carry.

The flip-flop 216 receives the carry of the second counter 214 and the carry of the first counter 212 through a reset terminal R and a set terminal S, respectively, and outputs a final field sync signal.

The operation of the circuit shown in FIG. 4 will now be described with reference to FIGS. 3 and 5A through 5E.

In FIG. 4, the MSB selector 202 receives the HDTV VSB data output from the matched filter 110 shown in FIG. 3, selects only the MSB of the input data, and outputs the selected MSB to the correlator 206. Here, the waveform of the data input to the MSB selector 202 is shown in FIG. 5A.

The reference signal generator 204 repeatedly generates signals which are the same as PN511 in the field sync segment.

The correlator 206 calculates the cross correlation value of the MSB output from the MSB selector 202 and the reference signal generated from 20 the reference signal generator 204, and accumulates the calculated correlation values in the unit of PN511 symbols, and outputs the accumulated correlation values to the first input terminal A of the comparator 208.

Here, when a large amount of noise, ghosts or interference are included in the transmitted signal, a correlation value of the PN63 data and the PN63 reference signal (which is referred to as a correlation value of PN63) is not negligible such that the peak value cannot be detected. However, because the correlation value of PN511 is about eight times larger than that of PN63, the peak value of PN511 can easily be detected. Accordingly, in order to detect the field sync timing, the correlation value of PN511 is used.

The comparator 208 compares the correlation value from the correlator 206 (input A) with the predetermined threshold value (input B), and outputs a "HIGH" signal when A≧B.

In other words, using the characteristic that the correlation value of the correlator 206 is maximized when the MSB sequence output from the MSB selector 202 is a field sync sequence, the comparator 208 compares the correlation value with the predetermined threshold value, and outputs a "High" signal having 1 symbol duration which indicates a field sync signal sequence when the correlation value is higher than the predetermined threshold value.

The output signal of the comparator 208, which is incomplete in timing, is held in a latch 210 according to the symbol clock fs recovered in the symbol clock recovery unit 112 shown in FIG. 3. The output of the latch 210 becomes a field sync timing signal. The waveform of the signal is shown in FIG. 5B.

The field sync timing signal shown in FIG. 5B is generated in each field. However, since the field sync timing signal is generated from an intermediate point of a field sync signal sequence and the width of the signal corresponds to one symbol interval (and thus is very narrow), the signal is inappropriate for direct use as a field sync signal.

Accordingly, the timing and the width of the field sync timing signal are controlled so that a field sync signal useful for signal processing can be generated.

When the field sync timing signal output from the latch 210 is input to a reset terminal (RST) of the first counter 212 and a data segment sync signal output from the data segment sync signal detector 114 is input to a clock terminal (CLK), the first counter is 212 counts 312 data segment sync signals and outputs a carry signal shown in FIG. 5C and is simultaneously reset by the field sync timing signal. The operation described above is repeatedly performed in each field.

Here, the first counter 212 counts 312 times, since the data segment sync signals generated by the data segment sync generator 114 shown in FIG. 3 are located at the beginning of the 312 data segments excluding the field sync segment.

When the carry signal from the first counter 212 is input to the reset terminal RST of the second counter 214 and the symbol clock fs generated by the symbol clock recovery unit 112 is input to a clock input terminal CLK thereof, the second counter 214 counts 832 symbol clock pulses and then outputs a carry signal shown in FIG. 5D and is simultaneously reset by the carry signal from the first counter 212.

Figure 1:
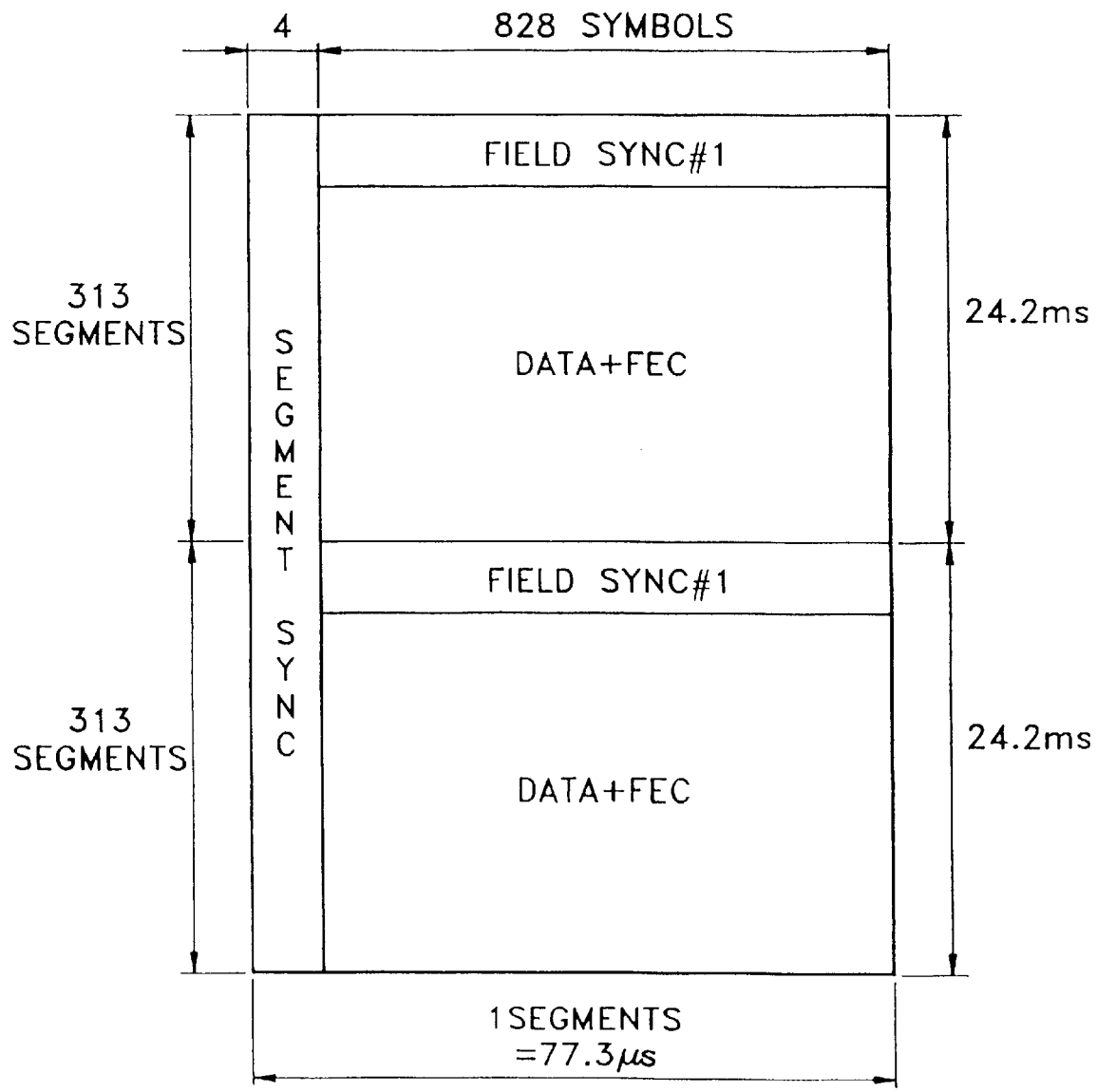
FIG. 1 illustrates the format of a VSB data frame in a GA-HDTV format.
Figure 2:
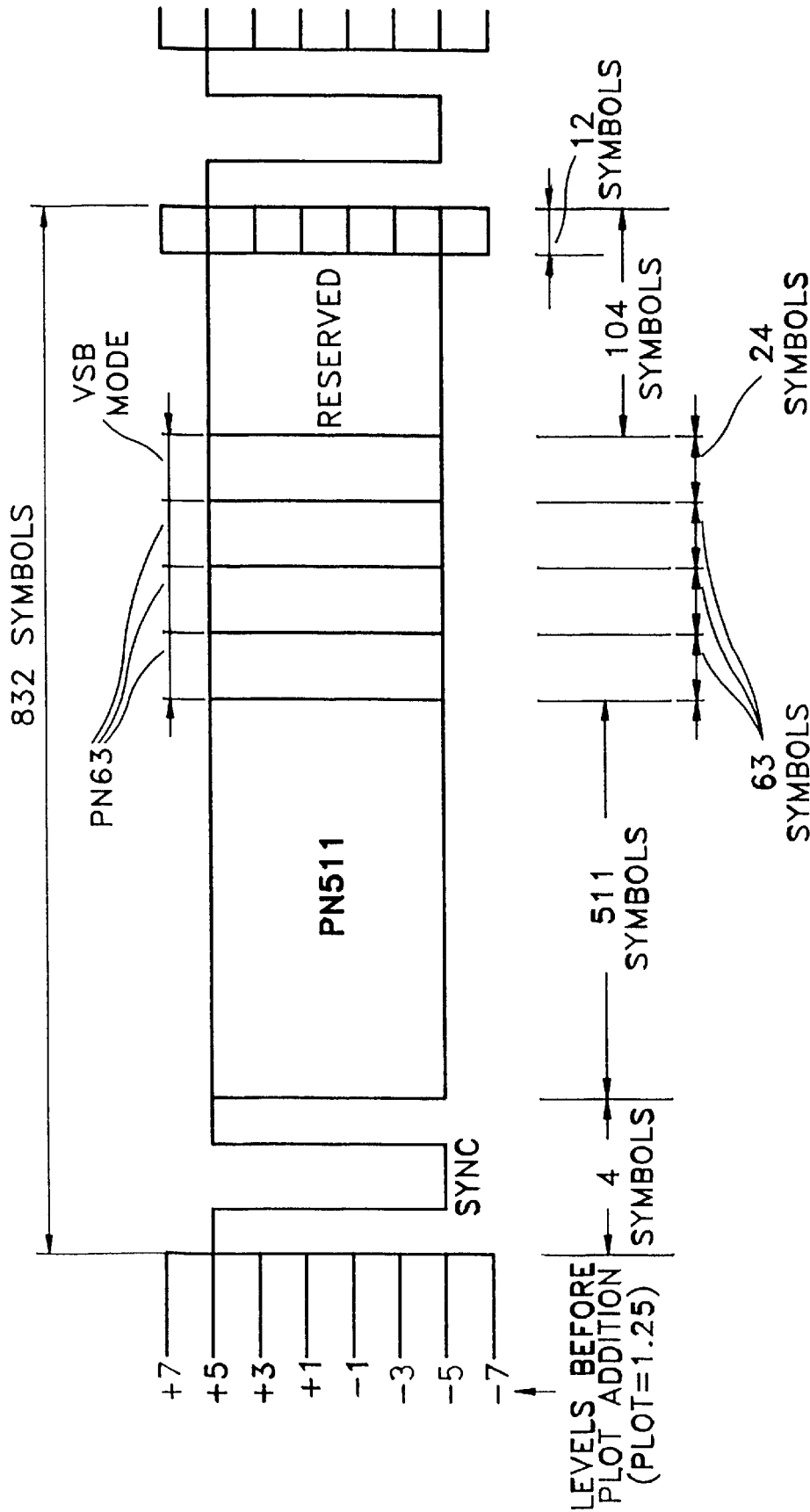
FIG. 2 is a drawing for explaining a VSB field sync signal of a GA-HDTV.

The second counter 214 counts 832 times according to the symbol clock fs, since one segment includes 832 symbols as shown in FIG. 1.

The flip-flop 216 outputs a "LOW" level signal through the output terminal Q when the carry signal from the second counter 214 is input to a reset terminal R, and it outputs a "HIGH" level signal when the carry signal from the first counter 212 is input to a set terminal S. Therefore, a perfect field sync signal which has a logic "HIGH" level during one field sync segment is output through an output terminal Q of the flip-flop 216, as shown in FIG. 5E.

As described above, the circuit of the present invention for detecting field sync signals which indicate the beginning of each field uses only one bit, i.e., MSB, of the input data to bring the same result as a floating point calculation. Thus, calculation time is reduced to a great extent, and the structure is simplified so that integration of the circuit is facilitated.

Also, according to the circuit of the present invention, the timing of the field sync signal is detected by use of the correlation value of the PN511 correlator, so that the field sync signal can be detected accurately even when there exists noise, ghost or interference.

Furthermore, since the circuit according to a preferred embodiment of the present invention produces a field sync signal having a waveform which has a logic "HIGH" state during the actual field sync segment interval, the circuit may be used in other blocks of the GA-HDTV system which requires a field sync signal having a waveform which has a logic "HIGH" state during the actual field sync segment interval without additional circuitry.

What is claimed is:

1. An apparatus for detecting a field sync signal in a HDTV receiver comprising:

sign bit selection means for selecting only a sign bit from a received HDTV signal;

correlation means for determining the correlation value of the selected sign bit and a predetermined reference signal;

detection means for comparing the correlation value with a threshold value to determine a field sync timing signal; and generating means for generating a field sync signal which has a logic "HIGH" level for a period corresponding to one field sync segment interval of the received HDTV signal based on the field sync timing signal.

2. An apparatus for detecting a field sync signal according to claim 1, wherein said generating means comprises:

a first counter for counting up to the number of data segments contained in a field of the received HDTV signal, outputting a first carry signal, and being reset by the field sync timing signal; and a second counter for counting up to the number of symbols contained in each data segment of the received HDTV signal, outputting a second carry signal, and being reset by the first carry signal;

a logic circuit which is set by the first carry signal and reset by the second carry signal, and outputs a field sync signal which has a logic "HIGH" level for a period corresponding to one field sync segment interval of the received HDTV signal.

3. An apparatus for detecting a field sync signal according to claim 1, wherein said detection means comprises:

a comparator for comparing said detected correlation value with the threshold value, to thereby output a comparative signal when the correlation value is higher than the threshold value; and a latch for holding said comparative signal and outputting the field sync timing signal.

4. An apparatus for detecting a field sync signal according to claim 1, wherein said correlation means determines the correlation value of Pseudo Number PN511 located in a field sync signal sequence which is output from said bit selection means and a PN511 reference signal.

5. An apparatus for detecting a field sync signal according to claim 1, wherein said correlation means outputs a maximum correlation value when the sign bit output from said bit selection means is the field sync signal sequence.

6. An apparatus for detecting a field sync signal according to claim 1, wherein the sign bit is a most significant bit.

7. An apparatus for detecting a field sync signal comprising:

detection means for detecting a segment sync signal located at the beginning of a data segment of a received HDTV signal and outputting a data segment sync signal;

a recovery unit for recovering a symbol clock signal from the HDTV signal in response to said data segment sync signal;

MSB selection means for selecting only an MSB from the received HDTV signal;

reference means for generating a predetermined reference signal;

correlation means for determining the correlation value of the MSB and the reference signal;

comparing means for comparing the correlation value with a threshold value and generating a field sync timing signal when the correlation value is higher than said threshold value;

first counting means, responsive to said data segment sync signal, for counting up to the number of data segments contained in a field of the received HDTV signal, outputting a first carry signal, and being reset by the field sync timing signal;

second counting means, responsive to the symbol clock, for counting the number of symbols in each segment of the received HDTV signal clock, outputting a second carry signal, and being reset by the first carry signal; and sync means for generating a field sync signal which has a logic "HIGH" level for a period corresponding to one field sync segment interval of the received HDTV signal in response to the first and second carry signals.

8. An apparatus for detecting a field sync signal according to claim 7, wherein said correlation means determines the correlation value of PN511 located in the field sync signal sequence which is output from said selection means and a PN511 reference signal.

9. An apparatus for detecting a field sync signal according to claim 7, wherein said correlation means outputs a maximum correlation value when the sign bit output from said selection means is a field sync signal sequence.

10. An apparatus for detecting a field sync signal according to claim 7, wherein said comparing means comprises:

a comparator for comparing said detected correlation value with the threshold value, to thereby output a comparative signal when the correlation value is higher than the threshold value; and a latch for holding said comparative signal and outputting the field sync timing signal.

11. An apparatus for detecting a field sync signal according to claim 7, wherein said sync means includes a flip-flop set by the first carry signal and reset by the second carry signal to output a field sync signal which has a logic "HIGH" level for a period corresponding to one field sync segment interval of the received HDTV signal.

12. A method of detecting a field sync signal included in a received HDTV signal, comprising:

a) selecting only a sign bit from the received HDTV signal;

b) determining the correlation value of the sign bit and a predetermined reference signal;

c) comparing the correlation value determined in said step b) with a threshold value, to thereby determine a field sync timing signal; and d) generating a field sync signal which has a logic "HIGH" level for a period corresponding to one field sync segment interval of the received HDTV signal in response to said field sync timing signal.

13. A method for detecting a field sync signal according to claim 12, wherein the reference signal is a pseudo number PN511 signal.

14. A method for detecting a field sync signal according to claim 12, wherein the sign bit is a most significant bit (MSB).

15. A method for detecting a field sync signal in each field of a received HDTV signal wherein a frame of data includes two fields, and each field includes a field sync segment and data segments of a first predetermined number, and each segment includes symbols of a second predetermined number, comprising the steps of:

a) detecting a segment synchronization signal located at the beginning of a data segment of the received HDTV signal and outputting the data segment sync signal;

b) recovering a symbol clock in response to the data segment sync signal;

c) selecting only a most significant bit (MSB) of the received HDTV signal;

d) determining the correlation value of the MSB and a predetermined reference signal;

e) comparing the correlation value with a threshold value and generating a field sync timing signal when the correlation value is higher than the threshold value;

f) counting up to the first predetermined number based on the data segment sync signal and outputting a first carry signal;

g) counting up to the second predetermined number based on the recovered symbol clock signal and outputting a second carry signal; and h) generating a field sync signal which has a logic "HIGH" level for a period corresponding to one field sync segment interval of the received HDTV signal in response to the first and second carry signals.

16. A method for detecting a field sync signal according to claim 15, wherein the predetermined reference signal is a Pseudo Number PN511 signal.

* * * * *